United States Patent [19]
Gardner

[11] Patent Number: 5,839,359
[45] Date of Patent: Nov. 24, 1998

[54] QUICKLY DISASSEMBLED GRILL

[76] Inventor: William D. Gardner, R.R. 4, Box 23-B Boulevard Station, Sioux City, Iowa 51109

[21] Appl. No.: 824,816

[22] Filed: Mar. 26, 1997

[51] Int. Cl.[6] .............................. A47J 37/06; A23L 1/01
[52] U.S. Cl. ................................. 99/376; 99/377; 99/349
[58] Field of Search ........................... 99/349, 376, 377, 99/392, 391, 422, 424; 219/524, 525

[56] References Cited

U.S. PATENT DOCUMENTS

| | | |
|---|---|---|
| 2,597,541 | 5/1952 | Squires et al. .......................... 99/377 |
| 2,899,888 | 8/1959 | Koci ..................................... 99/376 X |
| 3,348,470 | 10/1967 | Swanson .............................. 99/376 X |
| 4,700,619 | 10/1987 | Scanlon .................................... 99/349 |
| 5,070,775 | 12/1991 | Blake ....................................... 99/349 |

*Primary Examiner*—Reginald L. Alexander

[57] ABSTRACT

A readily disassembled grill for cooking both sides of a meat pattie simultaneously. The grill is disassembled for cleaning or service simply by the release of a few latches, eliminating any need for holes in parts of the grill being disassembled and for screw-type attaching devices.

5 Claims, 1 Drawing Sheet

QUICKLY DISASSEMBLED GRILL

BACKGROUND AND SUMMARY OF THE INVENTION

This invention pertains to grill devices commonly used by fast-food restaurants for cooking meat patties such as sausage or hamburger patties. Such grills repeatedly need service for resurfacing the plates with replacement non-stick surfaces.

Presently the surface of the cooking grill is a plate treated with a non-stick surface material such as polytetrafluoroethylene to resist sticking of the food to the cooking surface. The non-stick material is relatively soft and not very abrasive resistant and therefore needs refurbishing or replacement at intervals more frequent than may be desired.

In order to do the necessary servicing on the material it is necessary to shut down the grill and either work on the plates in place or to disassemble the grill. It therefore becomes desirable to keep the time for disassembly to a minimum so as to avoid removing the grill from service for more than a minimum of time.

By the present invention, the grill is constructed so that the surface plate is readily removable so that a substitute could be used while the original is being retreated. Or, if a substitute is not available, the original can be removed quickly and replaced quickly.

DESCRIPTION

Figure 1:
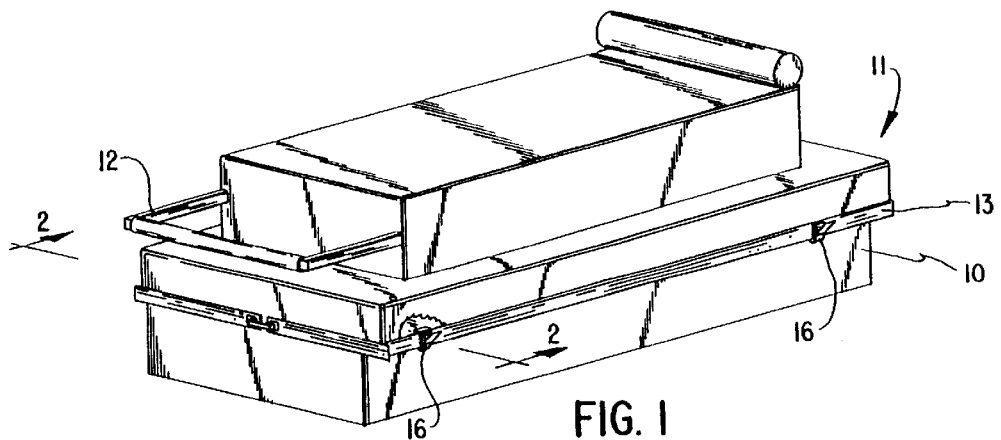
FIG. 1 is a perspective view of the grill fully assembled with a small part broken away to show underlying parts.

Briefly this invention comprises a device for the assembly of one part—usually the upper part—of a grill adapted to cook both sides of a meat pattie. The device allows quick and easy removal of the treated contact plate for substitution or removal for repair or treatment.

More specifically and referring to the drawings, the mechanism is used on a two sided grill having a lower base 10. This base includes a heating element and surface plate similar to that which will be described in connection with the upper tilting unit 11. This type of grill is in common use particularly in the fast-food industry.

The upper unit 11 is tiltably mounted on the base and may include a handle 12 by which the upper part may be tiltably raised.

The upper part includes an outside frame 13 which provides an exterior support for a heating element 14. This element is customarily fixed in the frame and radiates heat to a treated contact plate 15. The contact plate then gets hot enough to fry the meat. A similar plate is mounted in the base to cook the meat from below while the plate 15 on the upper unit is lowered so that the upper plate 15 contacts the top surface of the meat pattie and will cook it from the top.

The plate 15 and its corresponding counterpart in the base are treated with a compound designed to avoid sticking. Such compounds are well known in the art and are commonly used for that purpose in nearly all two-part grill units. However, the compound is relatively soft and does wear out or become scratched and loses some of its effectiveness causing the meat to stick more than desired. At such times it is desirable to insert a substitute plate or to be able to remove and replace the plate quickly.

Currently such plates are fastened into their holders commonly by bolts extending through the plate and heating element so as to hold the assembly in the upper unit 11. This problem can be much alleviated by the latches of the current invention.

Figure 2:
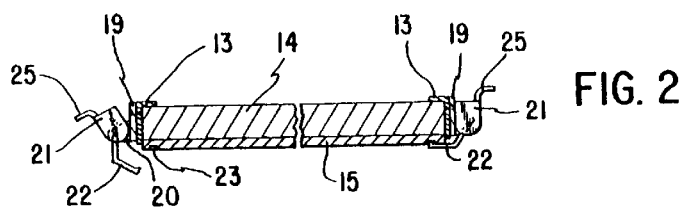
FIG. 2 is a sectional view from line 2—2 of FIG. 1

Near the four corners of the upper unit 11, latches 16 adapted to engage the plate 15 are affixed to the frame 13. As best shown in FIG. 2, the latch includes a mounting plate 19 fixed to the frame 13. A bracket 20 extends from the mounting plate 15. A latch member 21 is pivotally mounted on the bracket so that the member 21 can tilt from the latched position shown on the latch located on the right side of FIG. 2, to the release position shown on the latch on the left side. A hook link 22 is pivoted to the latch member 21 and by reason of the tilting of the latch member can be carried from the release position in which it hangs free to the latched position in which the hook engages a groove 23 formed in the plate 15. This groove 23 may extend only a short distance longitudinally of the plate 15, or may extend the full length. The requirement is that there must be a groove at the point at which the hook 22 contacts the plate 15. A handle 25 on the latch member 21 serves to make easy the latching and release of the hook.

With the hook 22 in the release position it is easy to drop the plate 15 out of the frame 13 and replace it with a substitute so that the grill will be out of service only momentarily. Then, the worn plate can be resurfaced while the substitute is being used so that nearly continuous operation of the grill is possible.

Figure 3:
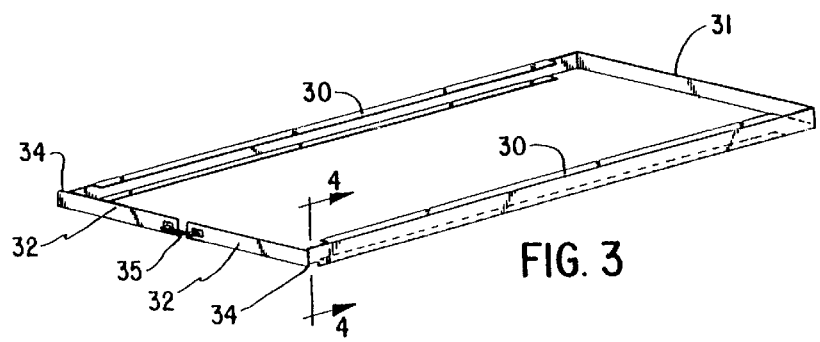
FIG. 3 is a perspective view of an alternate plate holder for the grill.
Figure 4:
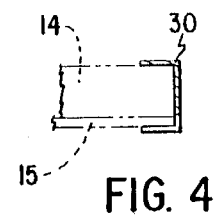
FIG. 4 is a partial sectional view for line 4—4 of FIG. 3

A slightly different device having the same goal is illustrated in FIGS. 3 and 4. In this embodiment, the frame instead of being an angle member is cross section has a pair of side rails 30 of channel form. The frame is generally of rectangular shape having the side rails 30, a solid rear rail 31 and a front rail in two pieces 32. Each of the pieces 32 of the front rail is pivoted to the side rails 30 at each of the front corners 34. A latch arrangement 35 will normally hold the frame in its rectangular form.

As shown in FIG. 4, the heating element 14 and plate 15 can be held in the channel form of the side rail 30. However, when it becomes desirable to remove the plate 15, the latch 35 can be released and pieces 32 of the front rail can be pivoted out of the way so that the plate 15 can be simply slid from the channel shape of the side rail 30 and removed for replacement or service.

Thus, the invention provides a convenient mechanism to hold the non-slip plate releasably in place in a grill and to allow easy and quick removal and replacement of that plate.

I claim:

1. A grill usable for cooking flattened meat patties on both faces simultaneously, said grill having a lower cooking surface and an upper cooking surface movably disposed relative to said lower cooking surface, said upper cooking surface including a plate treated with a non-sticking material, said upper cooking surface also including a frame for holding said plate, said frame and said plate of said upper cooking surface being rectangular in shape, said frame having a lever type, positive latch located near each of the corners of said rectangular shape, said latches each having hooked portions releasably engaged with said plate whereby said plate is releasably held in said frame.

2. The grill of claim 1 in which said plate is formed with grooves, said hooked portions being releasably engaged in said grooves.

3. The grill of claim 2 in which said rectangular shape includes longer sides defining a longitudinal direction, said grooves in said plate extending longitudinally of said plate.

4. The grill of claim 3 in which said grooves are comprised of relatively short sections, each section extending longitudinally of said plate only in the region contacted by said hooked portion of said latch.

5. A grill usable for cooking flattened meat patties on both faces simultaneously, said grill having a lower cooking surface and an upper cooking surface movably disposed relative to said lower cooking surface, said upper cooking surface including a plate treated with a non-sticking material, said upper cooking surface also including a frame for holding said plate, said frame consisting of two longitudinal side rails, having channel-shaped cross section, a rear rail connecting one end of each of side rail to form a frame adapted to engage said plate and a front rail consisting of two pieces, each of said two pieces being pivotally connected to one of said side rails the end of said side rail opposite said rear rail, a latch releasably holding the two ends of said pieces together to form said frame, and said plate having longitudinal edges disposed within said channel shaped side rail, said pieces of said front rail being thereby closeable to hold said plate releasably within said frame.

* * * * *